United States Patent [19]

Terada

[11] Patent Number: 5,161,140
[45] Date of Patent: Nov. 3, 1992

[54] TRACK JUMP CONTROL APPARATUS

[75] Inventor: Akio Terada, Tokyo, Japan

[73] Assignee: Sony Corporation, Tokyo, Japan

[21] Appl. No.: 608,754

[22] Filed: Nov. 5, 1990

[30] Foreign Application Priority Data

Nov. 15, 1989 [JP] Japan .................. 1-295112

[51] Int. Cl.5 ............................................. G11B 21/12
[52] U.S. Cl. .................. 369/44.28; 369/32; 360/78.07
[58] Field of Search .............. 369/44.28, 32, 44.27, 369/44.32; 360/77.05, 78.06, 78.07

[56] References Cited

U.S. PATENT DOCUMENTS

| | | | |
|---|---|---|---|
| 4,481,613 | 11/1984 | Yokota | 369/44.28 |
| 4,659,972 | 4/1987 | Uchikoshi et al. | 369/32 |
| 4,788,421 | 11/1988 | Ogawa et al. | 369/44.11 |
| 4,839,876 | 6/1989 | Fennema | 369/44.28 |
| 4,853,918 | 8/1989 | Kobyashi et al. | 369/44.28 |
| 4,931,889 | 6/1990 | Osafune | 360/78.07 |
| 5,036,506 | 7/1991 | Bierhoff | 369/32 |
| 5,063,545 | 11/1991 | Nishida | 369/32 |

FOREIGN PATENT DOCUMENTS

| | | | |
|---|---|---|---|
| 0094314 | 6/1983 | European Pat. Off. | 360/77.05 |
| 318443 | 5/1989 | European Pat. Off. | 369/32 |
| 372953 | 6/1990 | European Pat. Off. | 369/32 |

OTHER PUBLICATIONS

Patent Abstracts of Japan vol. 12, No. 86 (P-677)(2933) Mar. 18, 1988 & JP-A-62 219377 (Mitsubishi) Sep. 26, 1987.

*Primary Examiner*—Roy N. Envall, Jr.
*Assistant Examiner*—Jennifer L. Hazard
*Attorney, Agent, or Firm*—Alvin Sinderbrand; William S. Frommer

[57] ABSTRACT

A track jump control device by means of which a scanning head for scanning the recording track of the disc-shaped recording medium is moved to a target track position is disclosed. A signal obtained by differentiating a tracking error signal is used as speed data to perform a closed loop track jump control operation to achieve direct landing on the target track positively even under an environment highly susceptive to disturbances. The track jump control making use of the gray code information indicating the recording tracks on the disc-shaped recording medium on the track-by-track basis is switched to the track jump control making use of the differentiated tracking error signal or vice versa to realize direct landing on the target track quickly and positively by a simplified arrangement.

5 Claims, 8 Drawing Sheets

TRACK JUMP CONTROL APPARATUS

BACKGROUND OF THE INVENTION

1. Field of the Invention

This invention relates to a track jump control circuit in which a scanning head for scanning the recording tracks of a disc-shaped recording medium is moved to a target track position. This invention may be applied, for example, for controlling the scanning of an optical disc device in which a recording track formed on the optical disc in the form of a circumambient pattern is scanned by an optical beam produced by an optical head for recording and/or reproducing information signals along the recording track.

2. Prior Art

Known optical discs include an overwritable optical disc, such as a magneto-optical disc, a write-once type optical disc or unrewritable ROM type optical disc.

In such an optical disc device employing these optical discs as recording media, focusing servo or tracking servo is applied to an optical head having accommodated therein a laser diode for producing a data recording and/or reproducing laser beam or a photodetector for detecting the reflected laser light from the optical disc, whilst the optical disc is rotated at a constant angular velocity or at a constant linear velocity. The recording track formed in a circumambient pattern on the optical disc is scanned in this manner by the laser light for performing data recording or reproduction.

In such an optical disc apparatus in which a recording track or tracks formed on an optical disc in a circumambient pattern is scanned by a light beam from an optical head for recording and/or reproducing signals along said recording track, it is necessary to perform tracking control so that the recording track will be correctly scanned by the spot of the light beam scanning the recording track. To this end, a tracking error signal corresponding to the deviation of the light spot from the recording track in the track pitch direction is derived from the output of the optical head and fed back to a tracking actuator driving circuit for bringing the center of the light beam spot into coincidence with the track center through tracking control. A three-beam method and a push-pull method are known for detecting tracking errors in the optical disc apparatus.

In conventional optical disc apparatus, when the beam spot traverses the recording track, a tracking error signal $S_{TE}$ which changes sinusoidally as indicated by the formula $$S_{TE} = A\sin\left(2\pi \frac{x}{p}\right)$$

wherein x denotes a displacement of the beam spot from a track center of a recording track $TK_{(n)}$ in the track pitch direction and p denotes the track pitch, is derived from a detection output from the optical head, as shown in FIG. 1, and tracking control is performed so that the tracking error signal $S_{TE}$ will be reduced to zero.

On the other hand, for a track jumping operation, that is, for shifting the beam spot to an adjacent track or to a track spaced by several tracks from the current track, the tracking control is turned off and the optical head is moved at an elevated speed in a controlled manner so that the target speed will be reduced to approximately zero at the target track position, and the tracking control is turned on as soon as the target track position is reached so that the beam spot lands on the target track.

As one of the techniques for realizing a unified recording format for the above-mentioned various optical discs, a so-called sampled servo technique is proposed, according to which, similarly to the so-called sector servo in a hard disc (one of the magnetic disc types) servo signals are recorded (that is, preformatted) by clock pits or tracking pits at a predetermined distance or angular interval on the concentrically or spirally extending track or tracks on the disc, these discrete servo signals being sample-held during disc rotation to effect continuous servo control. Such a known optical disc is shown in FIG. 2 as an optical disc 10 having the recording format illustrated therein.

Referring to FIG. 2, the optical disc 10 has an annular label section 2 around a central opening 1 and an annular recording surface section 3 extending around the label section 2. In the recording surface section 3 is formed a spirally extending recording track tk in a circumambient pattern about the central opening 1. Each turn or circumambient track is divided into a predetermined number m of sectors $sc_1$, $sc_2$, ..., $sc_m$. Herein, m=32. The sectors bearing the same postscript number in the respective circumambient tracks, such as $sc_1$, are arrayed in the same radial direction of the optical disc 10. The optical disc 10, provided with these recording tracks tk, is loaded into an optical disc recording/reproducing apparatus, and is rotated in the direction shown by an arrow r so as to be used for data recording and/or reproduction with the aid of an optical beam.

Each sector $sc_1$, $sc_2$, ... or $sc_m$ in each circumambient track is constituted by an address data section ad at the leading end and a predetermined number n such as 43 of blocks $bl_1$, $bl_2$, ..., $bl_n$, arrayed next to the address data section ad along the recording track tk. These blocks $bl_1$, $bl_2$, ..., $bl_n$ are so arrayed that the blocks bearing the same postscript, such as blocks $bl_1$, of the sectors $sc_1$, $sc_2$, ..., $sc_m$ are arrayed in the radial direction of the optical disc 10. Each of these blocks $bl_1$, $bl_2$, ..., $bl_n$ of the sectors $sc_1$, $sc_2$, ..., $sc_m$ has a control record region $ar_C$ at the start end, followed by a data record region $ar_D$ to constitute a unit recording section. In the control record region $ar_C$ of each block $bl_1$, $bl_2$, ... or $bl_n$, tracking data pits $q_a$ and $q_b$ are formed on the outer and inner sides of a track centerline kc and a clock data pit $q_c$ on the track centerline kc. The manner in which the track data pits $q_a$ and $q_b$ and the block data pit $q_c$ are arrayed in a direction normal to the track centerline kc, that is, along the radius of the optical disc 10, is hereinafter explained. Referring to FIG. 3, the tracking data pits $q_b$ and the clock data pits $q_c$ are arrayed each in one line along a radius, whereas the tracking data pits $q_a$ are offset at intervals of 16 consecutive tracks in the longitudinal direction of the track tk. When the optical disc 10, in which the tracking data pits $q_a$ and $q_b$ and the clock data pits $q_c$ are provided in this manner in the control record region $ar_c$, is loaded in the recording/reproducing apparatus so as to be used for data recording or reproduction with the aid of an optical beam, the tracking data pits $q_a$ and $q_b$ and the clock data pits $q_c$ of the control record region $ar_c$ are read by the light beam so as to be used for various servo operations or clock generation. That is, clock signals are detected from the detected output of the clock data pits $q_c$ to generate necessary timing clocks, while the tracking error is found on the basis of the detected output of the tracking data pits $q_a$ and $q_b$ arrayed on the outer and the inner sides of the track centerline kc to perform tracking control. On the other hand, focusing control is performed on the basis of the detected output of a mirror surface region. The detected output of the tracking data pits $q_a$ is also used for performing a so-called traverse counting to find the number of the track being scanned by the optical head on the basis of the above mentioned offset of the tracking data pits $q_a$ at intervals of 16 consecutive tracks.

Meanwhile, an optical disc usually suffers from offsets, so that the target track position deviates as a result of the disc's rotation. Thus the speed of movement of the optical head which is detected by a speed sensor provided on the side of a mechanical base fails to indicate the true speed with which the light spot is moving on the optical disc.

Recently, an attempt has been made to detect the speed with which the light beam spot travels on the optical disc.

However, in the sampled servo system, the track traversing speed cannot be detected unless the light spot traverses one track within a time at least twice the sampling period, as may be demonstrated by the sampling theorem, such that the speed during high speed movement cannot be detected.

On the other hand, in the optical disc device of the sampled servo system, the tracking error signal $S_{TE}$ is produced on the basis of the detected output of the tracking data pits $q_a$ and $q_b$, and a track jump driving signal $S_{JP}$ formed from the tracking error signal $S_{TE}$, as shown in FIG. 4. The track jump driving signal $S_{JP}$ is supplied in an open loop to a tracking actuator to perform track jump control by a feedforward operation.

In the above described optical disc device utilizing the sampled servo system, the tracking error signal $S_{TE}$ is produced on the basis of the detected output of the tracking data pits $q_a$ and $q_b$. The track jump driving signal $S_{JP}$ is formed from the tracking error signal and supplied in an open loop to a tracking actuator to actuate the track jump drive by a feedforward control operation. Accordingly, the disc device is susceptible to malfunction due to disturbances and, above all, by vibrations, and hence a stable track jump operation cannot be performed in an environment likely to undergo excessive vibrations.

On the other hand, when the optical head is moved to the target track position to perform data recording and/or reproduction on or from the target recording track, the accessing speed cannot be detected with high accuracy and hence the target track cannot be reached by one accessing operation resulting in a prolonged access time.

When the track jump operation is performed with the use of gray code data, supposing that the gray code data is recorded at an interval of 12 μs on a recording track having a track pitch of, for example, 1.6 μs, speed data can be detected only up to 0.13 μm/s, on account of the properties of the gray code data. In addition, if the servo is range of the tracking servo equal to 3 kHz, for example, track capturing becomes infeasible at an inrush speed at or above 8 mm/s, with the result that direct landing on the target track cannot be achieved.

OBJECT AND SUMMARY OF THE INVENTION

It is therefore an object of the present invention to provide a track jump control device for moving a scanning head scanning a recording track of a disc-shaped recording medium to a target track position, wherein direct landing on the target track may be achieved quickly and positively even under an environment prone to disturbances.

In the track jump control device of the present invention, the tracking error signal corresponding to the deviation from the recording track in the track pitch direction is differentiated by differentiating means and the resulting differentiated signal is rectified by polarity inverting means to produce a speed data signal. The speed data signal is then used to apply speed control in a closed loop to achieve a track jump in a manner invulnerable to disturbances and positive direct landing on the target track.

Also, in the track jump control device according to the present invention, current track position data is detected by current track position detection means from gray code data indicating the recording tracks of the disc-shaped recording medium on a track-by-track basis. A target speed data signal is formed by target speed data signal forming means on the basis of current track position data, while speed data signals are formed by detecting changes in the gray code data by speed data signal forming means. The speed data signals are supplied to error and are switched by switching means in the vicinity of the target track position to effect a track jump operation in two different operating modes. That is, in an area relatively distant from the target track position, the speed data signal formed from the gray code data by the speed data signal forming means is supplied to the error detection means to effect a high speed track jump operation. On the other hand, in the vicinity of the target track, the speed data signal formed from the tracking error signal is supplied to the error detection means to effect a closed-loop track jump control to realize a track jump operation invulnerable to disturbances and a positive direct landing operation on the target track.

DESCRIPTION OF THE PREFERRED EMBODIMENT

Figure 1:
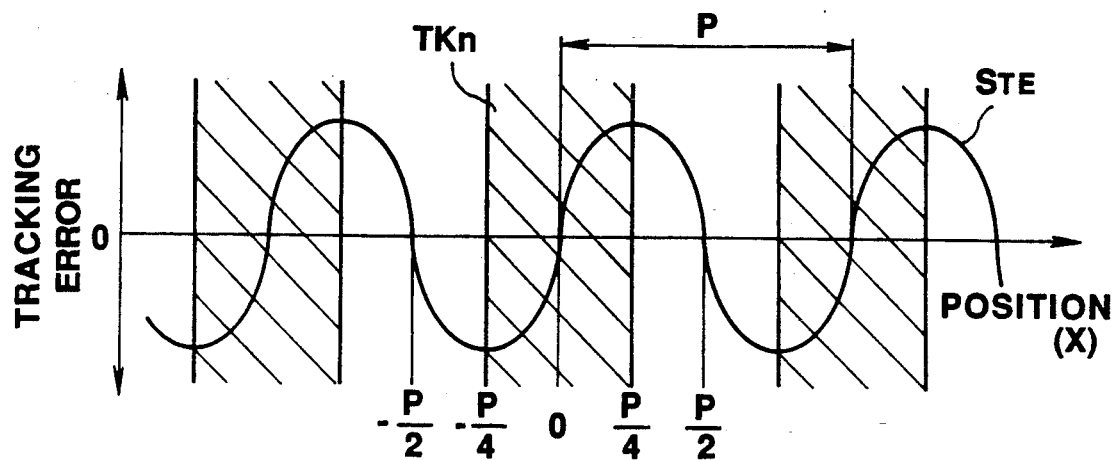
FIG. 1 is a signal waveform diagram for illustrating tracking error signals in an optical disc device.
Figure 4:
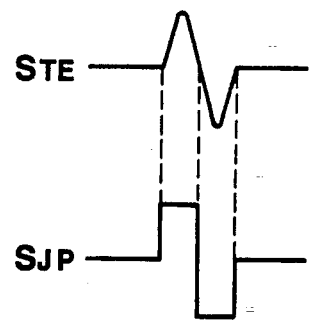
FIG. 4 is a signal waveform diagram for illustrating a conventional track jump operation in an optical disc device making use of an optical disc compatible with the sampled servo system.
Figure 2:
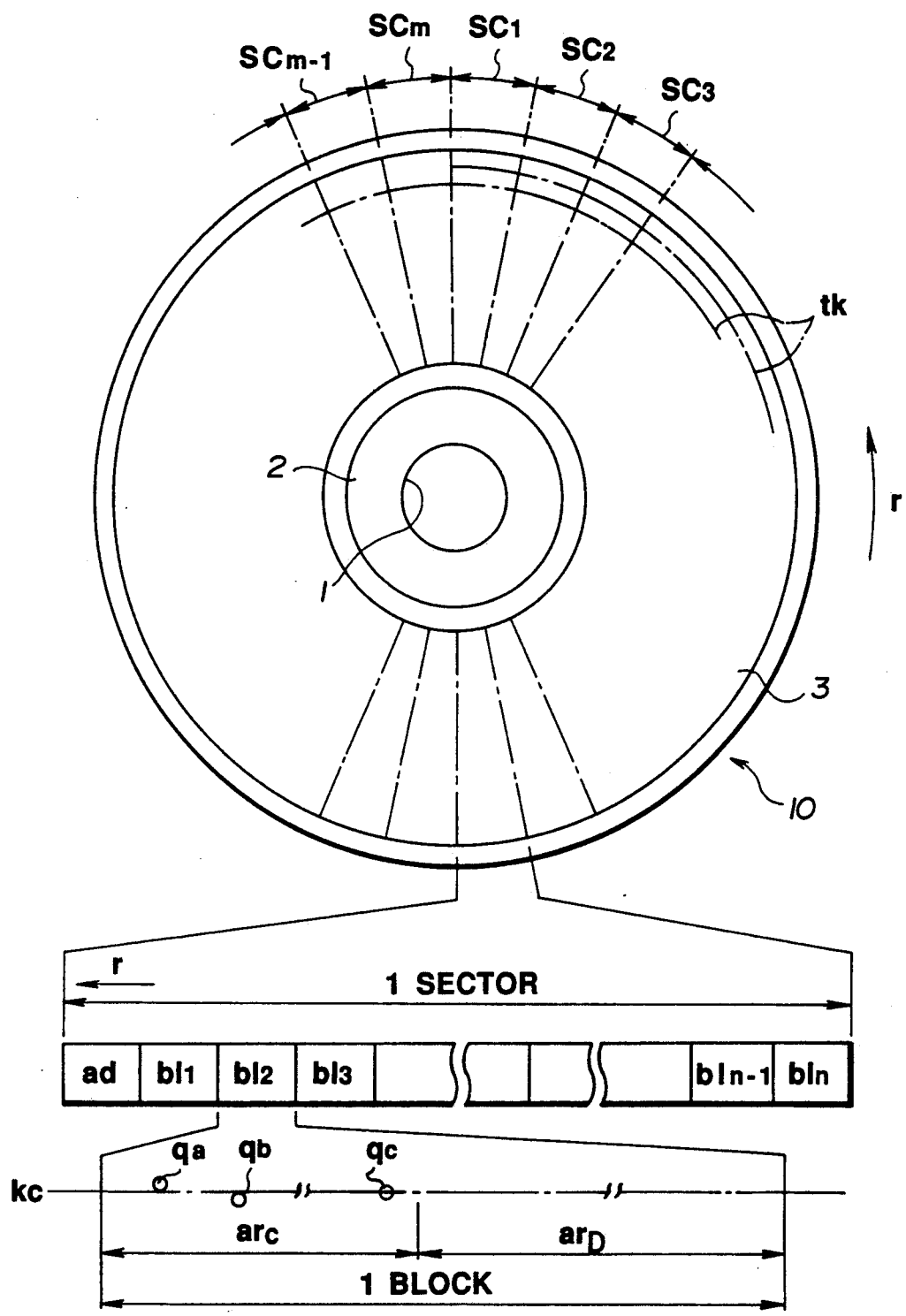
FIG. 2 shows a recording format for an optical disc of the sampled servo system.
Figure 3:
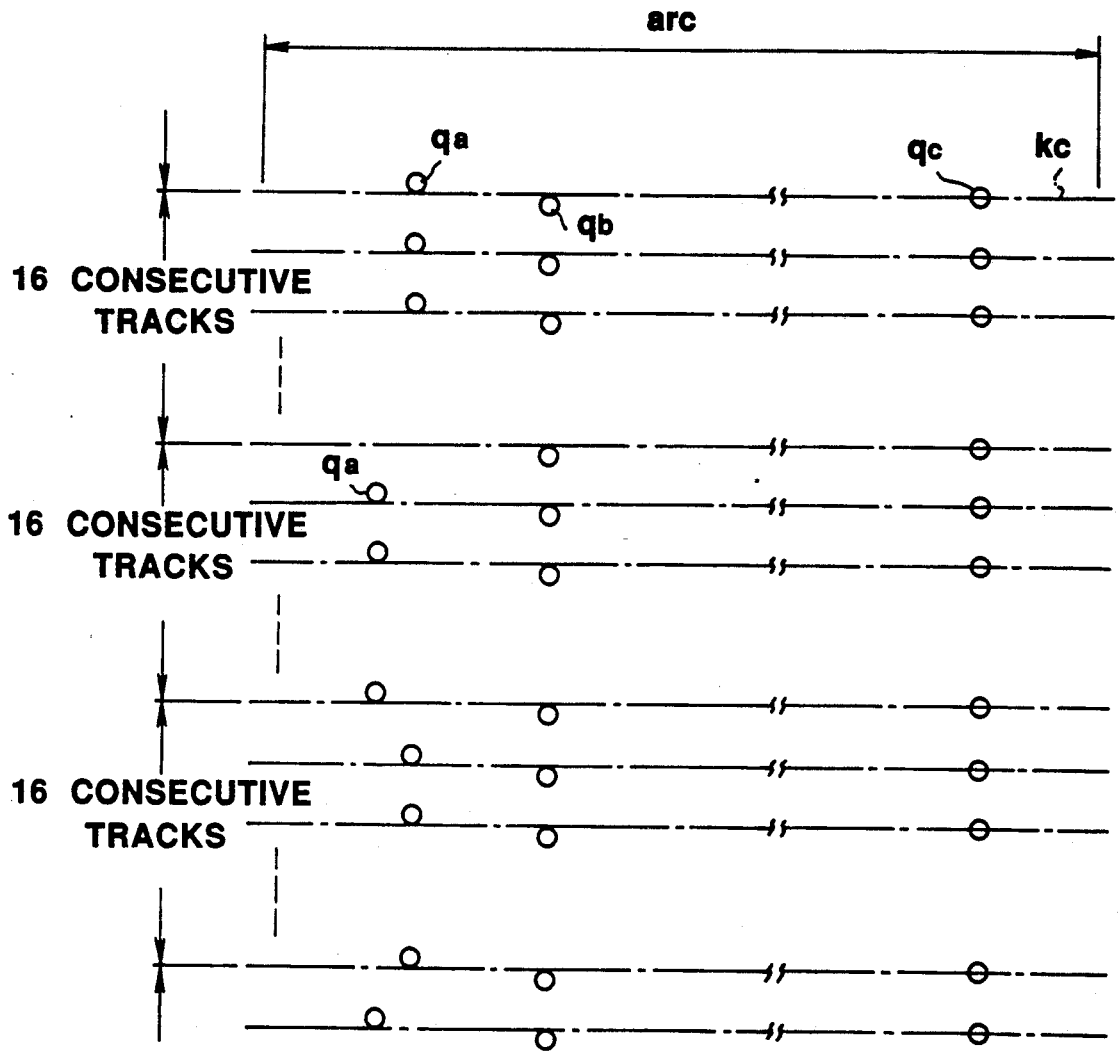
FIG. 3 shows the contents of a preformatted region in an optical disc compatible with the sampled servo system.

By referring to the drawings, an embodiment of the track jump control device according to the present invention will be explained in detail.

Figure 5:
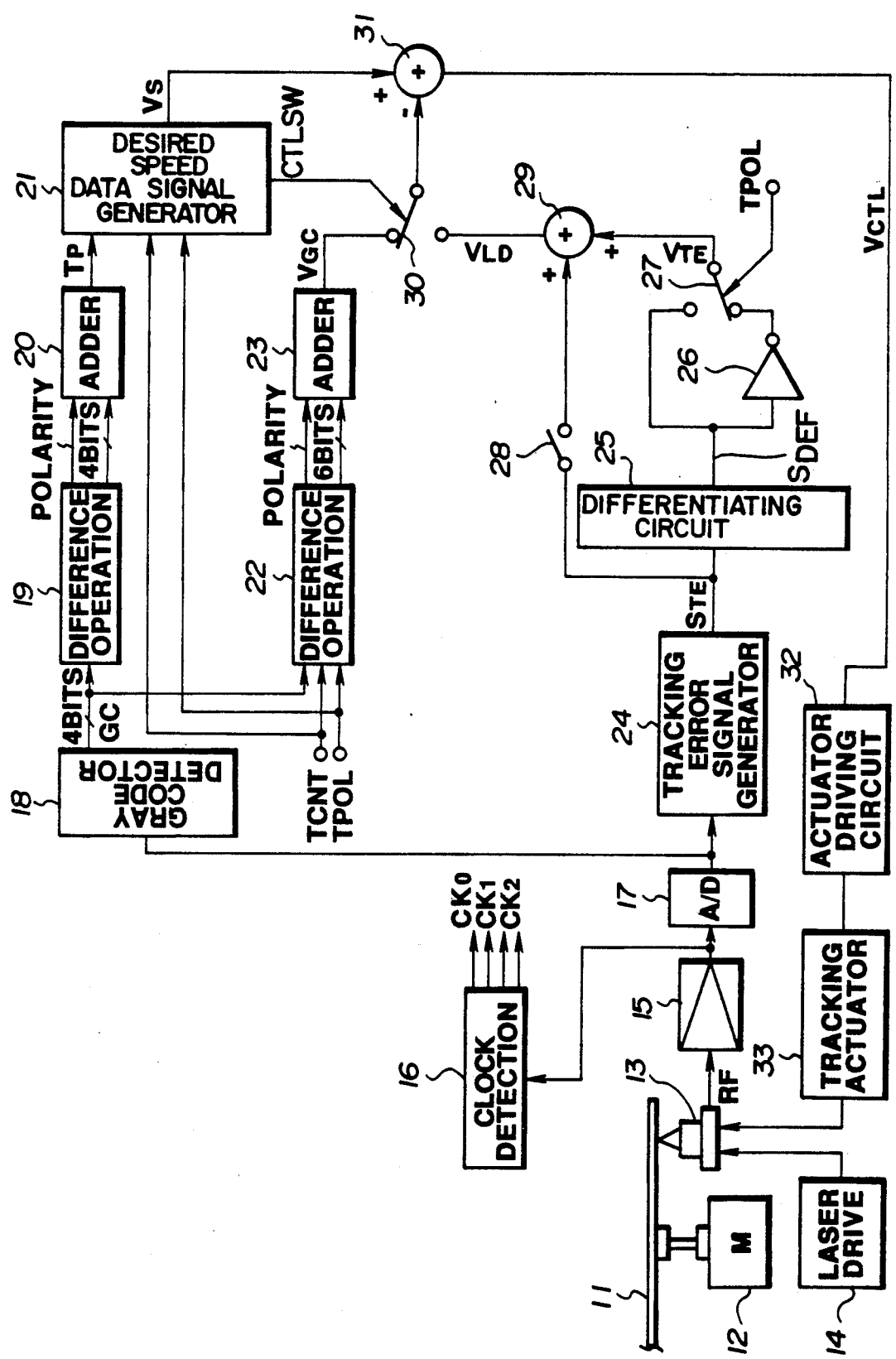
FIG. 5 is a block diagram showing an arrangement of a track jump control circuit according to the present invention.

The track jump control device of the present invention is applied in an optical disc device in which, as shown in FIG. 5, a recording track on an optical disc 11 is scanned by a light beam from an optical head 13 for recording and/or reproducing data along the recording track.

Figure 6:
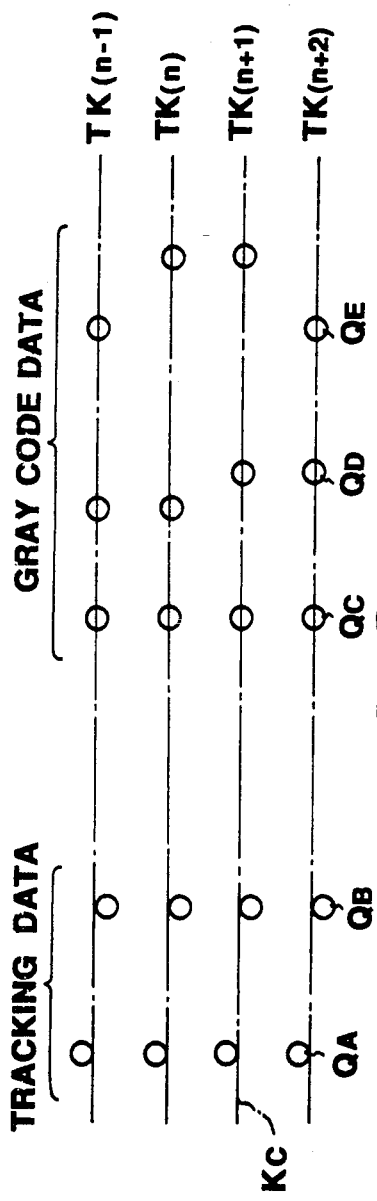
FIG. 6 shows the contents of a preformatted region in an optical disc employed in an optical disc device in which the track jump control circuit of FIG. 5 is applied.

Referring to FIG. 6, a large number of recording tracks $TK_n$ are formed in a circumambient pattern on the recording surface of the optical disc 11. In a control record region of each recording track $TK_n$, a pair of tracking data pits $Q_A$ and $Q_B$ are arrayed at a predetermined distance from each other in the track direction with an offset of one-fourth of the track pitch on the outer and inner peripheries of a track centerline $K_c$. There are also arrayed a clock data pit $Q_C$ and gray code data pits $Q_D$ and $Q_E$ at an interval of 16 recording tracks on the track centerline $K_c$ in the control record region for indicating each recording track $TK_{(n)}$ on a track-by-track basis with the clock data pit $Q_C$ as the reference.

The optical disc 11 is driven at a constant angular velocity (CAV) by a spindle motor 12 to which spindle servo control is applied.

The optical head 13 adapted for scanning the recording tracks of the rotating optical disc 11 by a light beam is constituted by a laser diode driven by a laser driving circuit 14 to produce a laser light beam, a focusing actuator for converging the laser light from the laser diode on the recording track of the disc 11 by an objective lens, and a photodetector for detecting the return light of the laser beam reflected by the disc 11. The optical head 13 supplies the detection output of the photodetector, as a reproduced RF signal, to a clock regenerating circuit 16 and an analog/digital (A/D) converter 17 by way of a head amplifier 15. The optical head 13 is mounted for movement radially of the optical disc 11 and may be moved along the radius of the disc 11 by a tracking actuator 33 as will be explained subsequently.

The clock detection circuit 16 performs clock detection or regeneration by means of a phase lock loop (PLL) on the basis of the detection output of the clock data $Q_C$ in the reproduced RF signal from the optical head 13, and generates various sampling clocks $CK_1$ and $CK_2$ and sync clocks $CK_0$ for overall system synchronization.

An A/D converter 17 converts the signal level of the reproduced RF signal into digital data formed by, for example, 8 bits. The digital data obtained by this A/D converter 17 are supplied to a signal reproducing system, not shown, while being also supplied to a gray code detector 18 and to a tracking error signal generator 24.

The gray code decoder 18 discriminates the pit pattern in the detection output of the gray code data pits $Q_D$ and $Q_E$ in the reproduced RF signal to decode the 4-bit gray code data GC indicating the current scanning position of the light spot of the optical head 12 on a track-by-track basis from the digital data from the A/D converter 17. The gray code data GC from the gray code decoder 18 is supplied to first and second difference operating circuits 19 and 22.

The first difference operating circuit 19 processes the above mentioned 4-bit gray code data GC from the gray code decoder 18 to find the difference of the current gray code data from the preceding gray code data to transmit a resulting 4-bit difference data to a first adder-counter 20 along with a polarity bit. This first adder-counter 20 cumulatively adds the 4-bit difference data with the annexed polarity bit to form an 8-bit current track position data $T_p$. The first adder-counter 20 is initialized at the start time of a track jump operation by a system controller, not shown, so that the offset will be reduced to zero at the target track position. The number of track offsets from the target track is detected, along with the polarity, by this first adder-counter 20, so as to be supplied as the above mentioned 8-bit current track position data $T_p$ to a target speed data signal generator 21.

To this target speed data signal generator 21 are supplied a control signal TCNT, which is a version in binary form of the tracking error signal $S_{TE}$ produced during track jump, and a control signal TPOL which is a version in the binary form of a signal dephased by 90° from the tracking error signal $S_{TE}$.

Figure 7:
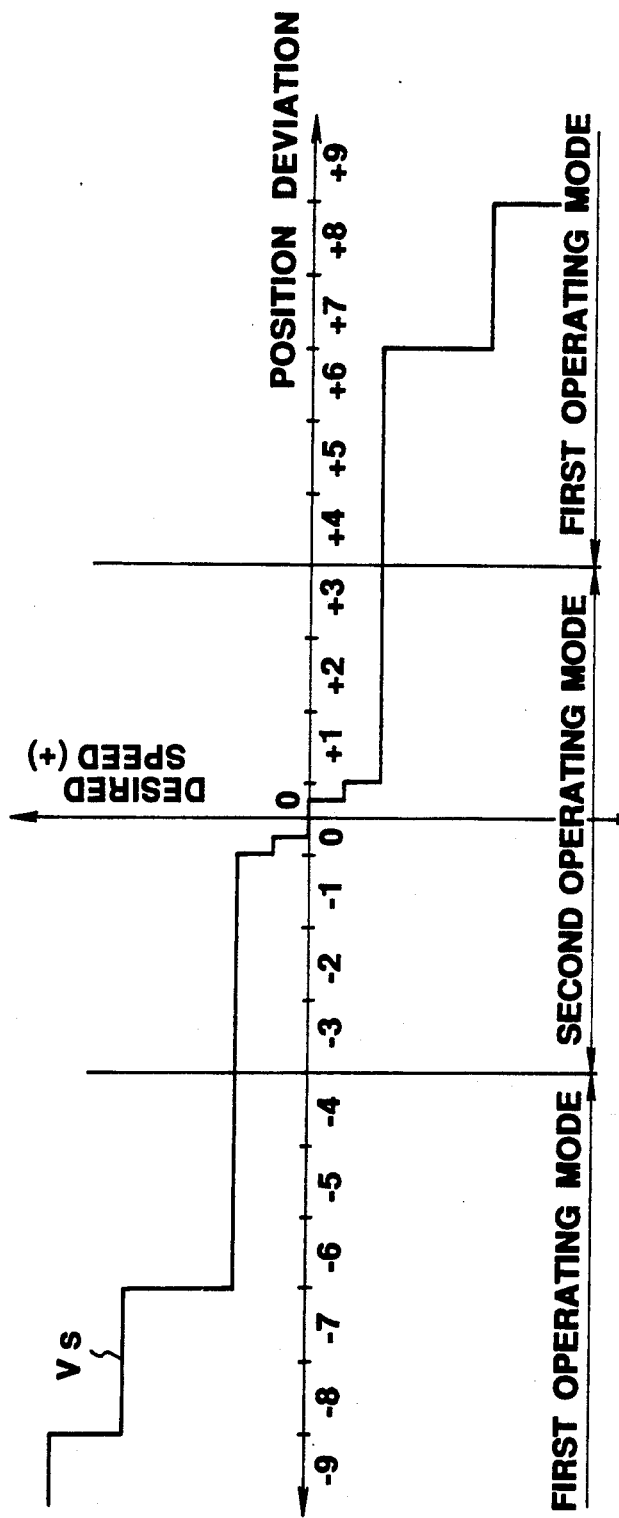
FIG. 7 is a signal waveform diagram showing a target speed data signal generated by a target speed data signal generating section of the circuit of FIG. 5.

The target speed data signal generator 21 generates, from the current track position data $T_p$ obtained from the first adder-counter 20 during the track jump and the control signals TCNT and TPOL, a target speed data signal $V_s$, shown in FIG. 7. Signal $V_s$ determines an access speed of the optical head 13 moved along the radius of the disc 11 by the tracking actuator 33. Generator 21 transmits the so-produced signal Vs to a comparator 31, while also transmitting a jump mode switching control signal CTLSW, at a position which is offset a predetermined number of tracks, herein ±3 tracks, from the target track position, to a signal selection switch circuit 30.

Figure 8:
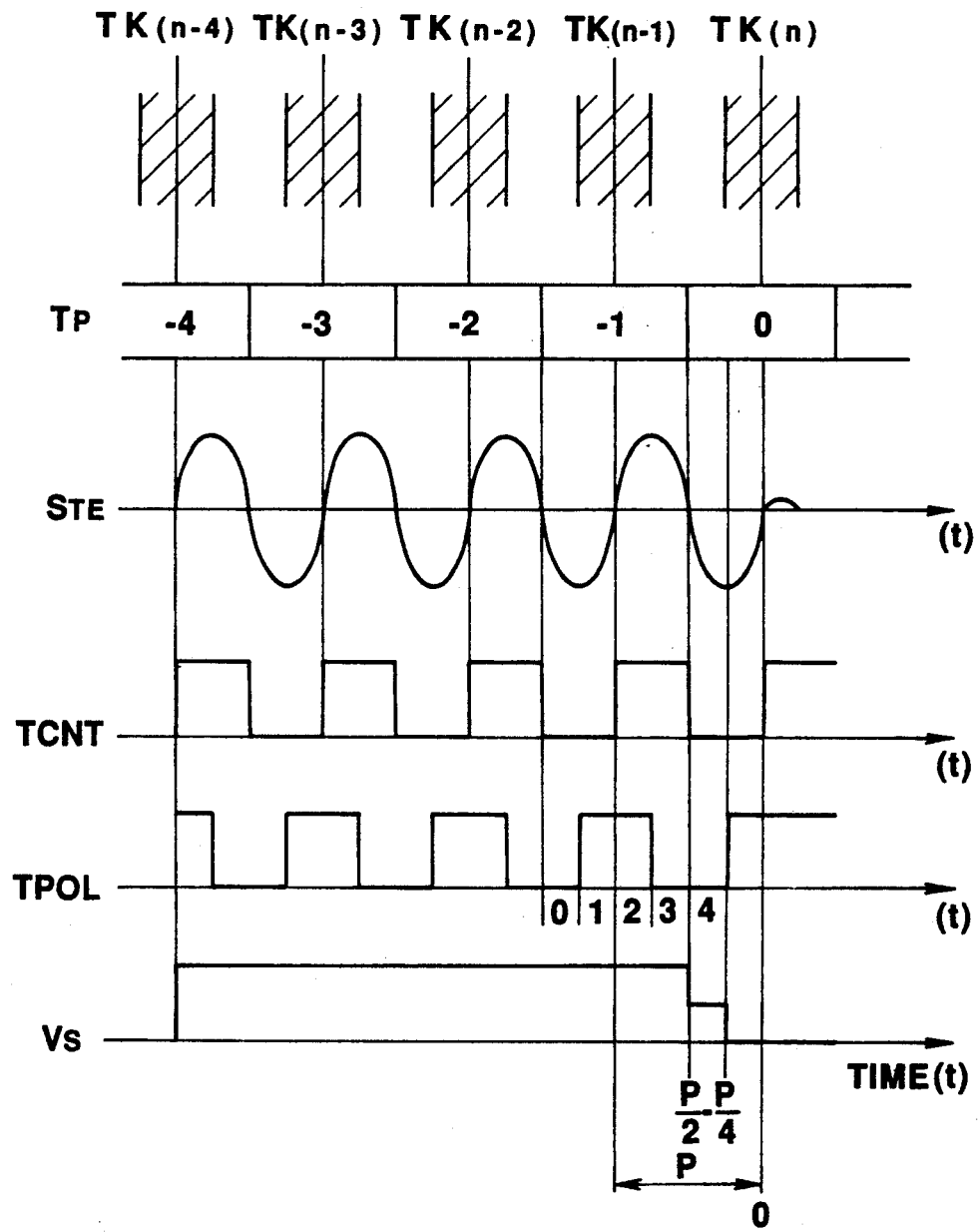
FIG. 8 is a signal waveform diagram for illustrating the operation of the target speed data signal generating section.

Referring to FIG. 8, the target speed data signal generator 21 performs an interpolating operation by dividing the track-by-track current track position data $T_p$ obtained from the first adder-counter 20 into four equal parts by the control signal TCNT which is the version in binary form of the tracking error signal $S_{TE}$ obtained during track jump and by the control signal TPOL which is the version in binary form of the signal dephased by 90° from the tracking error signal $S_{TE}$. The interpolating operation is carried out so that the target speed will be lowered by one half at a position one half the track pitch ahead of the target track $TK_{(n)}$, and also so that the target speed will be reduced to zero at a position one-fourth of the track pitch ahead of the target track $TK_{(n)}$.

Figure 9:
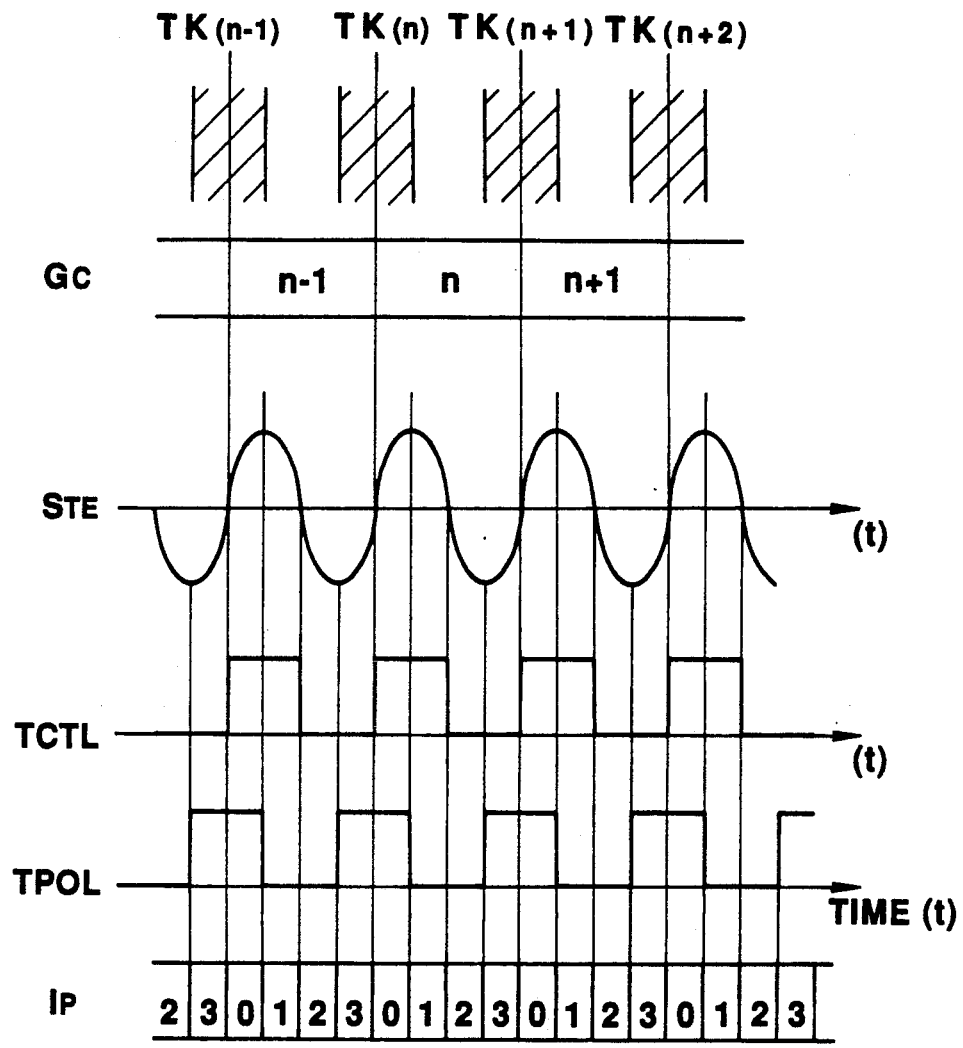
FIG. 9 is a signal waveform diagram for illustrating the operation of a second difference operating circuit forming a part of the track jump control circuit of FIG. 5.

The control signals TCNT and TPOL are also supplied to the second difference operating circuit 22. As shown in FIG. 9, when processing difference data for the track-by-track current position data indicated by the gray code data GC obtained at the gray code decoder 18, the second difference operating circuit 22 generates an interpolating signal IP for dividing each track pitch P into four equal portions on the basis of the aforementioned control signals TCNT and TPOL to raise the resolution of the speed data by the interpolating operation employing the interpolating signal IP. Circuit 22 transmits the 6-bit difference data indicating the speed data to a second adder-counter 23 along with polarity data. The second adder-counter 23 performs a cumulative addition of the 6-bit difference data with the annexed polarity bit eight times to generate a speed data signal $V_{GC}$ which has been raised further in resolution by a factor of 8.

The above mentioned speed data signal $V_{GC}$, which is formed by the second difference operating circuit 22 and the second adder-counter 23 from the gray code data GC obtained at the gray code decoder 18, is supplied, when the current track position is distant more than ±3 tracks from the target track position, to the comparator circuit 31, by way of the signal selection switch circuit 30 controlled by the jump mode switching control signal CTLSW.

Figure 10:
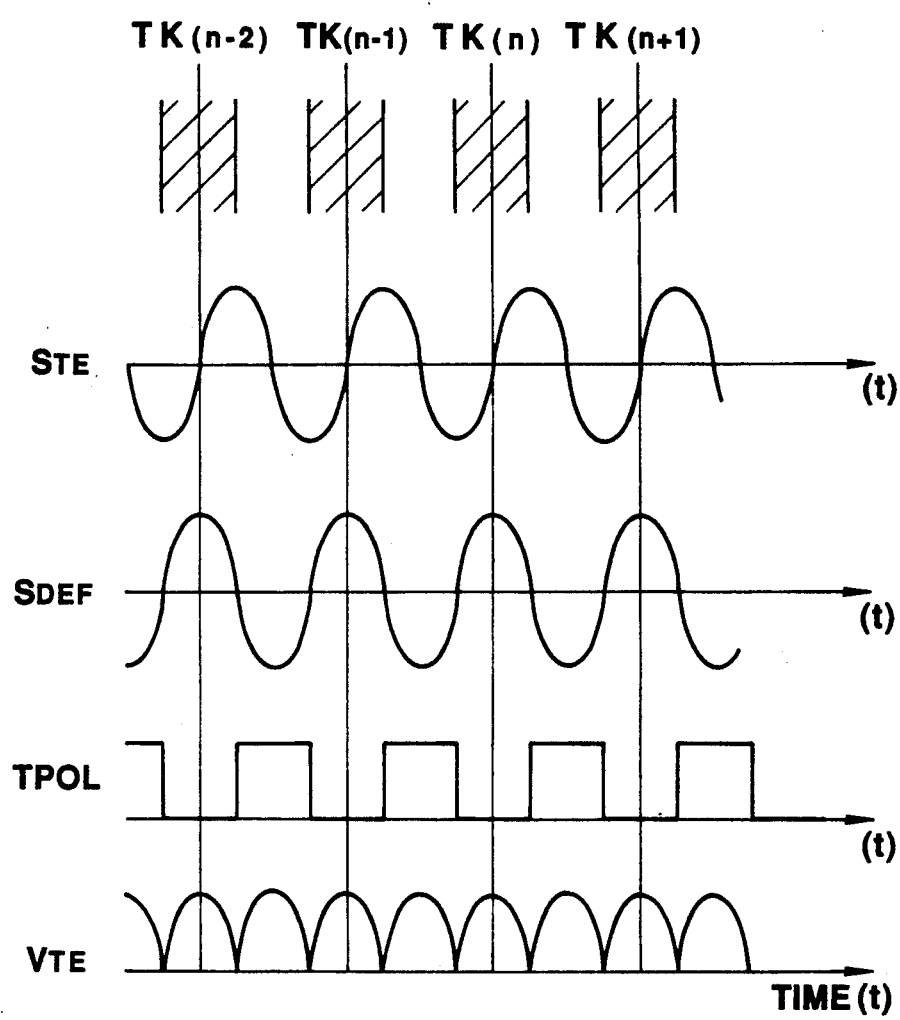
FIG. 10 is a signal waveform diagram for illustrating the operation of polarity inverting means forming a part of the track jump control circuit of FIG. 5.

On the other hand, the tracking error signal generator 24 processes the digital data from the A/D converter 17 to find the signal level difference of the detection outputs of the tracking data pits $Q_A$ and $Q_B$ in the reproduced RF signals to form a tracking error signal $S_{TE}$ which changes sinusoidally in proportion to the offset from the track center of the recording track $TK_{(n)}$ in the track pitch direction of the recording track $TK_{(n)}$ as shown in FIG. 10. The tracking error signal $S_{TE}$, thus produced in the tracking error signal generator 24, is supplied to a differentiating circuit 25, while being also supplied to an adder 29 by way of a switch 28.

The differentiating circuit 25 differentiates the tracking error signal $S_{TE}$ in the form of a sine wave (that is the position data component) to form a differentiated signal $S_{DEF}$ in the form of a cosine wave as the speed data component. The differentiated signal $S_{DEF}$ from the differentiating circuit 25 is supplied to a signal selection switch circuit 27 both directly and by way of a polarity inverting circuit 26.

The signal selection switch circuit 27 performs a switching operation under the control of the control signal TPOL which is the version in binary form of the signal dephased 90° with respect to the tracking error signal $S_{TE}$. This signal selection switching circuit 27 selects the differentiated signal $S_{DEF}$ supplied directly from the differentiating circuit 25 during an on-track state and the polarity-inverted differentiated signal $S_{DEF}$ supplied from the differentiating circuit 25 by way of the polarity inverting circuit 26 during an off-track state. This serves to rectify the differentiated signal $S_{DEF}$ to form a full-wave rectified speed data signal $V_{TE}$ having the same polarity during off-track as during on-track, as shown in FIG. 10. The speed data signal $V_{TE}$, obtained from signal selection circuit 27, is supplied to the adder 29.

The adder 29 adds the speed data signal $V_{TE}$ to the tracking error signal $S_{TE}$ supplied thereto from the tracking error signal generator 24 by way of the switch 28. It is noted that this switch 28 is turned off during track jump and after termination of track jump switch 28 is turned on at which time the tracking control is turned on. When the current track position is within ±3 tracks from the target track position, the addition output signal from the adder 29 is supplied as a landing control signal $V_{LD}$ to the comparator circuit 31 by means of the signal selection switch circuit 30 which is controlled by the aforementioned jump mode switching control signal CTLSW.

The comparator circuit 31 compares the speed data signal $V_{GC}$ supplied from the second adder-counter 23 by way of the signal selection switch circuit 30 or the landing control signal $V_{LD}$ from adder 29 to the target speed data signal $V_s$ from the target speed data signal generator 21 to supply the resulting error signal as a drive control signal $V_{CTL}$ to an actuator driving circuit 32.

The actuator driving circuit 32 causes a driving current corresponding to the driving control signal $V_{CTL}$ to flow through a driving coil of tracking actuator 33 for moving the optical head 13 to the target track position.

That is, in the above track jump control circuit, the gray code data GC indicating the recording tracks $TK_{(n)}$ of the optical disc 11 on a track-by-track basis is produced by the gray code decoder 18 and, on the basis of the current track position data $T_p$ obtained from the gray code data GC, the target speed data signal $V_s$ relative to the current track position is formed by the target speed data generator 21. The signal selection switch circuit 30 is controllably switched at a position ±3 tracks away from the target track position between the two different operating modes to effect track jump to the target track position on the basis of the target speed data signal $V_S$ formed from the gray code data GC.

First, during the first operating mode when the scanning head is more than ±3 tracks distant from the target track position, changes in the current track position data indicated by the gray code data GC are detected by the second difference operating circuit 22 and cumulatively added in the second addition circuit 23 to produce the speed data signal $V_{GC}$. Signal $V_{GC}$ is selected by the signal selection switch circuit 30 and an error signal of the speed data signal $V_{GC}$ from the target speed data signal $V_S$ is supplied from the comparator circuit 31 as the driving control signal $V_{CTL}$ supplied to the actuator driving circuit 32. For this operating mode, a high-speed track jump operation may be achieved with the use of the speed data signal $V_{GC}$ obtained from the gray code data GC.

In addition, in the present embodiment, when the difference data of the track-by-track current track data indicated by the gray code data GC obtained by the gray code decoder 18 is processed as the speed data, the interpolating operation of dividing each track pitch into four equal portions by the control signals TCNT and TPOL is performed to raise the speed data resolution by a factor of four while the difference data indicating the speed data and the polarity bits are cumulatively added eight times to form the speed data signal $V_{GC}$ which is raised in resolution by a factor of eight. In this manner, it becomes possible to produce speed data with a resolution of approximately 2 mm/s at a sampling period of 200 μs or 5 kHz from the gray code data GC to perform a speed control with the range of about 300 Hz to realize a high-speed track jump operation.

During the second operating mode, for which the scanning head is within ±3 tracks of the target track position, the tracking error signal $S_{TE}$ obtained at the tracking error signal generator 24 is differentiated by the differentiating circuit 25 to produce the differentiated signal $S_{DEF}$, which is rectified by the polarity inverting circuit 26 and the signal selection switch circuit 27 to produce the rectified speed data signal $V_{TE}$. This signal $V_{TE}$ is selected by the signal selection switch circuit 30 and the error signal of the speed data signal $V_{TE}$ from the target speed data signal $V_S$ is supplied as the drive control signal $V_{CTL}$ from the comparator circuit 31 to the actuator driving circuit 32. During this operating mode, the speed data signal $V_{TE}$ obtained from the tracking error signal $S_{TE}$ may be used to apply a closed loop speed control to perform a track jump operation which is less susceptive to disturbances. The speed data with a sampling period in the order of 25 μs or 40 kHz having an infinitesimally small resolution may be obtained from the tracking error signal $S_{TE}$ such that the speed data may be effectively detected up to a resolution of approximately 5 mm/s to perform a broad range speed control with a range of approximately 3 kHz. In this manner, a direct landing operation may be achieved positively.

In addition, in the present embodiment, the target speed data signal generator 21 generates the target speed data signal $V_S$ for lowering the target speed by one half at a position one half the track pitch from the target track $TK_{(n)}$ and reducing the target speed to zero at a position one-fourth the track pitch ahead of the target track $TK_{(n)}$, so that tracking control may be started with less overshoot at the time of the above mentioned direct landing during the first operating mode.

In this manner, in the track jump control device of the present embodiment, a high speed track jump control may be performed during the first operating mode when the scanning head is away from the target track position by ±3 tracks, while direct landing on the target track may be achieved during the second operating mode when the scanning head is within ±3 tracks from the target track position.

What is claimed is:

1. A track jump control device for controlling movement to a target track of a scanning head scanning recording tracks on a disc-shaped recording medium in response to a generally sinusoidal tracking error signal representing a tracking error of said scanning head with respect to respective ones of said recording tracks in a track pitch direction thereof, comprising differentiating means for differentiating said sinusoidal tracking error signal to produce a differentiated tracking error signal having first and second opposed polarities when said scanning head is respectively on and off track, polarity inverting means for inverting one of said first and second opposed polarities of said differentiated tracking error signal to produce a first speed data signal having the same polarity when said scanning head is on-track as when said scanning head is off-track, current position data detection means for producing current track position data by detecting a current track position of said scanning head from gray code data indicating positions of respective recording tracks of said disc-shaped recording medium on a track-by-track basis, target speed data signal generating means for forming a target speed data signal on the basis of said current track position data obtained from said current position data detection means, speed data signal forming means for forming a second speed data signal by detecting changes in said gray code data, error detection means for producing a speed error data signal indicating an error of a selected one of the first speed data signal and the second speed data signal with respect to the target speed data signal, switching means for supplying the second speed data signal to said error detection means when said scanning head is outside a predetermined vicinity of the target track position and for supplying said first speed data signal to said error detection means when said scanning head is within said predetermined vicinity of the target track position, said switching means being controlled on the basis of the current track position data, and means for controlling a track jump of said scanning head on the basis of said speed error data signal produced by said error detection means.

2. The track jump control device according to claim 1 wherein said switching means is controlled to supply one of the first and second speed data signals on the basis of a switch control signal output from said target speed data signal generating means.

3. The track jump device according to claim 1 wherein the target speed data signal generating means is operative to generate a first value of said target speed data signal representing a first target speed of said scanning head at a first position which is substantially one-half of a track pitch ahead of the target track position, said first target speed being substantially one-half of a target speed of said scanning head indicated by a second value of said target speed data signal generated by said target speed data signal generating means when said scanning head is at a position adjacent to said first position and more than one-half of a track pitch ahead of the target track position, and to generate a third value of the target speed data signal representing a target speed of zero at a position substantially one-fourth of the track pitch ahead of the target track position.

4. The track jump control device according to claim 1 wherein said speed data signal forming means is operative to form said second speed data signal with a resolution which is less than the track pitch in response to an interpolated signal dividing the track pitch by N, N being an integer and produced in response to a first control signal which is a version in binary form of said tracking error signal and a second control signal which is a version in binary form of a signal dephased 90° from said tracking error signal.

5. The track jump control device according to claim 4 wherein said speed data signal forming means includes a difference operating means for producing difference data indicating a speed of said scanning head together with polarity data through an interpolation operation in response to said interpolated signal and added means for forming said second speed data signal from said polarity data and said difference data.

* * * * *